(12) United States Patent
Gardella et al.

(10) Patent No.: US 7,876,971 B2
(45) Date of Patent: Jan. 25, 2011

(54) METHOD AND SYSTEM FOR SIGNAL PROCESSING, FOR INSTANCE FOR MOBILE 3D GRAPHIC PIPELINES, AND COMPUTER PROGRAM PRODUCT THEREFOR

(75) Inventors: Pierluigi Gardella, Montanaso Lombardo (IT); Massimiliano Barone, Bresso (IT); Edoardo Gallizio, Arizzano (IT); Danilo Pau, Sesto San Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 257 days.

(21) Appl. No.: 11/526,146

(22) Filed: Sep. 21, 2006

(65) Prior Publication Data
US 2007/0071312 A1 Mar. 29, 2007

Related U.S. Application Data

(63) Continuation of application No. PCT/IB2005/000117, filed on Jan. 14, 2005.

(30) Foreign Application Priority Data
Mar. 22, 2004 (EP) .................................. 04006823

(51) Int. Cl.
*G06K 9/40* (2006.01)
*G06K 9/36* (2006.01)
*G06K 9/48* (2006.01)
*G06K 15/00* (2006.01)
*G06F 17/00* (2006.01)
*G06T 1/00* (2006.01)
*G06T 1/20* (2006.01)
*G06T 5/00* (2006.01)

(52) U.S. Cl. ....................... 382/254; 382/241; 382/261; 382/269; 345/418; 345/506; 358/3.26

(58) Field of Classification Search ................. 382/254, 382/261, 241, 269; 345/418, 506; 358/3.26
See application file for complete search history.

(56) References Cited

U.S. PATENT DOCUMENTS 5,287,438 A    2/1994    Kelleher (Continued)

OTHER PUBLICATIONS

K. Akeley, "RealityEngine Graphics," Proceedings of 20th Annual Conference on Computer Graphics and Interactive Techniques, ACM Press, 1993, pp. 109-116.

(Continued)

*Primary Examiner*—Anand Bhatnagar
*Assistant Examiner*—Randolph Chu
(74) *Attorney, Agent, or Firm*—Lisa K. Jorgenson; Robert Iannucci; Seed IP Law Group PLLC

(57) ABSTRACT

A system renders a primitive of an image to be displayed, for instance in a mobile 3D graphic pipeline, the primitive including a set of pixels. The system locates the pixels in the area of the primitive, generates, for each pixel located in the area, a set of associated sub-pixels, borrows a set of sub-pixels from neighboring pixels, subjects the set of associated sub-pixels and the borrowed set of pixels to adaptive filtering to create an adaptively filtered set of sub-pixels, and further filters the adaptively filtered set of sub-pixels to compute a final pixel for display. Preferably, the set of associated sub-pixels fulfils at least one of the following: the set includes two associated sub-pixels and the set includes associated sub-pixels placed on pixel edges.

56 Claims, 4 Drawing Sheets

U.S. PATENT DOCUMENTS

| | | | |
|---|---|---|---|
| 5,668,940 | A | 9/1997 | Steiner et al. |
| 7,050,068 | B1 * | 5/2006 | Bastos et al. ............... 345/613 |
| 2002/0130886 | A1 * | 9/2002 | Baldwin ............... 345/611 |
| 2003/0095134 | A1 * | 5/2003 | Tuomi et al. ............... 345/611 |
| 2004/0120594 | A1 | 6/2004 | Vitali et al. |
| 2006/0188163 | A1 * | 8/2006 | Elder ............... 382/232 |

OTHER PUBLICATIONS

L. Carpenter, "The A-buffer, an Antialiased Hidden Surface Method," Computer Graphics, vol. 18, No. 3, Jul. 1984, pp. 103-108.

E. Catmull, "A Hidden-Surface Algorithm with Anti-Aliasing," Proceedings of the 5th Annual Conference on Computer Graphics and Interactive Techniques, ACM Press, 1978, pp. 6-11.

F. Crow, "The Aliasing Problem in Computer-Generated Shaded Images," Communications of the ACM, vol. 20, No. 11, Nov. 1977, pp. 799-805.

N. Jouppi et al., "Z3: An Economical Hardware Technique for High-Quality Antialiasing and Transparency," Proceedings of the 1999 Eurographics/SIGGRAPH Workshop on Graphics Hardware, AMC Press, 1999, pp. 85-93.

J. Korein et al., "Temporal Anti-Aliasing in Computer Generated Animation," Computer Graphics, vol. 17, No. 3, Jul. 1983, pp. 377-388.

J. Montrym et al., "InfiniteReality: A Real-Time Graphics System," Proceedings of 24th Annual Conference on Computer Graphics and Interactive Techniques, ACM Press/Addison-Wesley Publishing Co., 1997, pp. 293-302.

A. Schilling et al., "Exact: Algorithm and Hardware Architecture for an Improved A-Buffer," Computer Graphics, vol. 27, No. 4, Aug. 1993, pp. 85-91.

S. Winner et al., "Hardware Accelerated Rendering of Antialiasing Using a Modified A-buffer Algorithm," Proceedings of the 24th Annual Conference on Computer Graphics and Interactive Technologies, AMC Press/Addison-Wesley Publishing Co., 1997, pp. 307-316.

C. Wittenbrink, "R-Buffer: A Pointerless A-Buffer Hardware Architecture," Proceedings of the ACM SIGGRAPH/EUROGRAPHICS Workshop on Graphics Hardware, ACM Press, 2001, pp. 73-80.

R. Balasubramanian et al., "Sequential scalar quantization of color images," Journal of Electronic Imaging, 3(1): 45-59, Jan. 1994.

* cited by examiner

METHOD AND SYSTEM FOR SIGNAL PROCESSING, FOR INSTANCE FOR MOBILE 3D GRAPHIC PIPELINES, AND COMPUTER PROGRAM PRODUCT THEREFOR

BACKGROUND OF THE INVENTION

1. Field of the Invention

The present invention relates to 3D graphic technology.

2. Description of the Related Art

While significant progress over the recent years has greatly contributed to increasing the realism and overall quality of rendering of images, a type of artifact that still affects computer generated pictures is the aliasing effect referred to as "staircasing" or "jaggies".

That effect, which is mostly manifest at polygon edges, is due to lack of sufficient pixel availability to render smoothly lines, points and polygon edges as defined mathematically. When a scene is processed by the rendering pipeline and transposed in a pixel matrix, a color is assigned to each pixel depending on whether it is covered by another object belonging to the scene. This approach does not take in consideration adequately the possibility for a pixel to be covered partially by an object as it may typically happen at object edges. The consequence is an abrupt color variation between the object and the background.

Aliasing is in fact very annoying. A typical 3D scene has many objects composed of a thousand (and even more) triangles and aliasing artifacts are very visible at object edges. In particular when the scene has moving portions, the artifacts become evident as flickering details and instability of the contours. This decreases the realism perceived.

Since the size of those artifacts cannot exceed the pixel dimension, the net effect is decreased by using increased picture resolution. For example, an image without any anti-aliasing will look better with 1600×1200 resolution than with 1024×768 resolution. The human eye can detect artifacts up to about 600 points per inch but unfortunately no commercial monitor has such resolution.

Methods to decrease aliasing artifacts, named anti-aliasing techniques, have the goal of making those transitions smoother by processing edge pixels. Anti-aliasing techniques are needed to decrease the visual impairment and provide the illusion of a higher-than-real screen resolution.

Such techniques have been developed for a long time and many of them have been used successfully in off-line rendering. Over the last ten years, computational power available run-time reached a level that permits implementation of these techniques with hardware support in real time.

A generic OpenGL pipeline for 3D interactive graphic will be now described in order to provide a general introduction to the specific technology considered. This description fulfils the double aim of i) facilitating a discussion of the related art and the intrinsic disadvantages of prior art solutions, and ii) highlighting the specific contribution of the invention to the prior art in question.

Briefly, an OpenGL pipeline for 3D interactive graphics is able to implement a set of algorithms that process a tri-dimensional synthetic scene involving motion, and is able to show it on a bi-dimensional display. Ideally, the process of generating and displaying the scene is decomposed in consecutive steps or pipeline stages. Each stage has a specific task and provides the input for the next one. The stages have a varying complexity, which varies from one stage to another: typically stages that process and affect pixels (e.g., the late stages of the pipeline) are more complex than those that process the 3D scene details.

Roughly speaking, 70% of the computational resources are needed by rasterizer and fragment operations while the remaining is needed by the geometry stages. This is because the final shape of each pixel is obtained by applying repeatedly the same conceptual steps on the same pixel, while other operations are executed only once per 3D object.

For a 3D pipeline it is thus vital to use as few operations as possible while achieving a good level of detail and a minimum guaranteed frame rate.

A plurality of 3D objects (or models) composes a 3D scene that is placed and moves inside a tri-dimensional space of coordinates. Each object is comprised of a number of graphic primitives. The appearance of the object depends on the number of primitives that compose it: the higher the number of the primitives, the higher the level of detail perceived from the visual point of view.

A geometric primitive should be a simple entity that can be easily processed by a real pipeline. The algorithms used during this processing depend on the geometric nature of the primitives. Examples of primitives are:

points
lines
triangles
quads (squares)
polygons
higher-order surfaces

Excluding lines and points, an adequate object representation is provided via triangles and such a representation will be assumed by way of simplicity throughout the description that follows. In fact, a triangle is a simple, easy-to-process planar convex surface. Quads, instead, are not planar and more difficult to manage. In brief, the higher the number of triangles composing an object, the higher the graphic detail achieved.

Each triangle is defined by its vertices. Thus, each 3D scene can be completely defined by a list of vertices, which are tri-dimensional points placed in a reference coordinate system. Those vertices are associated to each primitive to which they belong. Each vertex can be defined by associating to it the following information:

X, Y, Z real coordinates
R, G, B color components
Additional information can be the following:
alpha factors (one or more),
three real coordinates to specify the normal vector associated to the vertex. This vector is used by the lighting stage to apply a light to the primitive,
two or more coordinates used as addresses of suitable 2 or 3 maps, from which it is possible to extract pixel information associated to the vertices in order to contribute to their final colors.

For example, if a vertex is defined by: XYZ, RGB, alpha, UV texture coordinates and Nx, Ny, Nz normal coordinates each expressed as a 32 bit single precision floating point number, then the memory requirement for storing each vertices will be 48 bytes.

To locate a 3D object within a scene, certain geometric transformations are needed. These can be decomposed in a set of simple affine transformations like rotation, translation, scaling etc. Each object can be moved independently from the others by transforming its vertices at a certain instant. Natural motion is achieved by carefully applying transformations in sequence in order to obtain a discrete-linear approximation of real, continuous motion. Such transformations are not incremental with respect to the previous ones. The position of the object at a time "t" is obtained by applying transformations to the object geometry considered at an initial time.

Usually, another requirement is permitting the scene to be watched from a given position where the observer can stay. This can be thought of as a window through which the 3D scene is watched. Global motion is a result of the object motion and the motion (if any) of the viewpoint. Alternatively, the viewpoint can be like a camera that samples the 3D scene.

The 3D scene is displayed on a monitor through a bi-dimensional grid of pixels each one defined by (R,G,B) colors. Then some operations are applied to each pixel before display. These operations are those demanding most of the computational power. The pixels compose a frame that is a snapshot from the camera viewpoint, taken a number of times per second as defined by the frame rate. Typically a frame rate of 20-30 frames per second (fps) is needed to achieve a fluid motion perception by the viewer.

Before describing the pipeline stages, it is advantageous to describe how 3D objects are defined, placed and moved inside the virtual tri-dimensional world.

Different Cartesian reference systems are used in 3D pipelines:

model space: each models corresponds to a "local" reference system. The origin can be at a point of it, such as, e.g., the lowest one, world space: all models are placed within this unique system (OpenGL does not use this and goes directly from the "model space" to the "view space"), view space (or Camera Space): the viewpoint is placed in this space (alternatively, it may be placed in a "world space" point). The world space is transformed in order to have the "camera space" with the camera placed at the origin and directed to the negative z-axis. In the case of OpenGL, the "GL_MODELVIEW" matrix set the transformation from "model space" to "view space". In this phase, it is possible to detect what objects are potentially visible (i.e., have a negative x coordinate in the "view space") while culling the others that are not visible, clip space: after "camera space" there is "clip space"; there it is possible to detect what primitives are visible using the "clipping" process and send them through the pipeline. "Clip space" is a space obtained through a perspective transform, in order to have a "view volume", that is a parallelepiped if the transform is orthogonal and a "frustum" if the transform is of a perspective type. It projects visible 3D objects onto a bi-dimensional plane that has a projection center placed at the camera itself (projective transform) or at infinity (orthogonal transform). In OpenGL, the "view volume" is normalized as a unity cube defined by two vertices with (−1, −1, −1) and (1, 1, 1) coordinates in order to have more efficient clipping operations. Besides, a primitive with "clip space" coordinates within the cube is potentially visible. The "GL_PROJECTION" matrix is able to transform a 3D object from "camera space" coordinate to projected normalized coordinates, screen space: 3D primitive coordinates in the "clip space" are re-scaled into 2D screen coordinates depending on the real screen resolution. In OpenGL, this happens thanks to the "glViewPort( )" function by fixing screen coordinates.

There are no univocal conventions for the number of stage or types of operations implemented. A typical configuration will be described below by way of general reference.

FIG. 1 is a block diagram illustrating a typical 3D graphic system 100 and its various stages.

A useful classification of the operations implemented is based on the input type processed by each stage. Accordingly, the pipeline operations can be classified in the following modes:

operations per-vertex: these are applied to the vertexes associated to each primitive that composes the scene. Geometric transforms are examples of these operations;

operations per-triangle: these are applied to the primitives that compose the scene. "Clipping" and "culling" are good examples: the former defines what parts of the primitives are inside of "view volume" and, depending on this intersection, defines how these are cut; the latter determines if those points are outside the "view volume" or back facing the "view point";

operations per-pixel: they operate directly to the pixels. Examples are rendering, per-pixel lighting, per pixel texturing, fragment operations where one or more fragments are associated to each pixel. Another difference with the other types of operations considered previously is that "per-pixel" or "per fragment" operations can be applied repeatedly to the same displayed pixel. This is the main reason why high complexity operations reside in this stage: in fact they will influence also the frame rate. Up-conversion methods may reduce the number of "per pixel" operations in order to save computational power associated with them.

On the basis of the above definitions, the 3D graphic system 100 shown in FIG. 1 can be subdivided in four main stages:

an application/scene stage 101
a geometry stage 111;
a triangle setup stage 112;
a rendering/rasterization stage 113.

The geometry stage 111, the triangle setup stage 112 and the rendering/rasterization stage 113 are part of a pipelined graphic engine 110.

Lights 107 and textures 108 represent the information regarding 3D objects 106 input to the application/scene stage 101.

Operations in the application/scene stage 101 are defined and set by the programmer using a API (Application Protocol Interface): OpenGL is an example of a set of such APIs. Typically, the operations implemented are database management, motion set-up of 3D objects and camera description of the content of a 3D animation, control of primitive visibility ("occlusion culling"), level of scene details (LOD, the number of primitives used to render the 3D scene).

The geometry stage 111 is the first pipeline stage. The associated operations are mainly "per-vertex" operations and the geometry stage 111 includes operations suitable for moving 3D objects. Motion is obtained by applying geometric transforms to vertices of the primitives in each single object of the scene. Transforms are of the affine type and defined in an affine space where two entities are defined: points and vectors. Results of transformation are vectors or points.

The transforms used in a 3D pipeline can be grouped in two main families, i.e.:

rigid body transforms, i.e., roto-translation plus scaling where the results is still within the 3D space; and
project transforms (perspective, orthogonal etc.) that move a primitive from the 3D space to the 2D space where those objects are located to be displayed on a screen.

These transforms use suitable square 4×4 arrays. Each affine transform can be obtained by properly defining each coefficient in such arrays.

In the geometry stage 111 other operations such as "culling", "clipping", "screen space transform", "lighting", "backface culling", are also implemented, fully or partly, depending on the kind of implementation.

These geometry operations can be briefly described as follows:

culling: 3D objects are now in the "clip space". In openGL "clip space" is a unit cube defined by (−1, −1, −1) and (1, 1, 1) coordinate vertices. All those triangles whose vertices are inside the cube are potentially visible (but some of them might occlude partially or totally the vision of others). All the triangles that have vertices falling outside the unit cube, from the same side, are culled and will not be processed by later stages of the pipeline; thus only a decreased set of triangles needs to be processed;

clipping: this is similar to culling but is more complex. Clipping processes triangles that are partially inside and partially outside the unit cube. For example, if two vertices of a triangle are inside the cube and only one outside, then the triangle is partially visible. In particular, visible parts will have a quadrilateral shape where two more vertices are defined as intersections between the triangle and the faces of the unit cube. The clipping operation computes the two intersections and, since the pipeline processes only triangles, the quad is re-tasseled and then decomposed in triangles. This is performed on potentially visible triangles and the new triangle list is concatenated with the visible tingles obtained after culling;

back-face culling: it is quite convenient to cull the triangles in earlier stages of the pipeline since this will appreciably decrease the "potentially visible" triangles submitted to later stages and processing needed. Assuming that a 3D model is composed of triangles inside the unit cube (which means that they are potentially visible), the triangles can be of two types: those that are visible to the observer in that they are "front facing" and those that are not visible in that they are "back facing". "Back-face culling" is able to remove from the list of potentially visible triangles those of the "back-face" type. For symmetric objects, 50% of the triangles are front facing while the others are back facing. Removing 50% of the triangles means avoiding all the subsequent pipeline computations on their vertices;

lighting: this takes place after the scene has been transformed and positioned in the "view space". After this it is possible to apply correctly the lights on the 3D objects. The model used is very simplified with respect to the real world situation. For example, an object can be lit by some sources without reflections, which happens in reality. A very detailed and realistic lighting scheme easily becomes very complex from the computational viewpoint to be implemented in a 3D pipeline.

A simplified lighting model briefly described herein includes two main lights, global and local, giving rise to three main types of lighting:

directional: it is a global type and the source is placed at a distance notionally infinite from the objects in the scene. The light of the sun is a good example of this type of lighting: all the rays are parallel;

point light: it is local and positioned at a point inside the "view space". Its rays emanate to all directions: a light bulb is a good example of this type of lighting;

spot: rays are emitted in only one direction within a limited cone of light; car headlights are typical examples of this kind of lighting.

All effects are mixed in order to have a global $i_{tot}$ effect.

$$i_{tot} = i_{amb} + i_{diff} + i_{spec}$$

When a single light affects an object, then the final effect also depends on the material properties of the lit object. For that reason, openGL and direct 3D allow to specify the "material color properties" that contribute to the definition of the final lighting effect for a surface.

These properties are defined as:
$m_{amb}$: Ambient Material Color
$m_{diff}$: Diffuse Material Color
$m_{spec}$: Specular Material Color
$m_{shi}$: Shininess Material Color
$m_{emi}$: Emissive Material Color These are placed in the equations for the lighting model which, even though simplified, turns out to be a highly complex one especially if more lights influence the scene.

To reach a compromise between sophisticated lighting schemes and acceptable complexity, certain pipelines use "light maps". These are pre-computed maps of lights adapted to be super imposed on the primitives during the texturing stage. Hybrid techniques exist that mix lights computed in the "geometry stage" (the so-called "lighting per-vertex"), and light-maps (the so-called "lighting per-pixel"). For example, a directional light can be computed with "lighting per-vertex", while spot lights are simulated with ad-hoc light-map.

Screen space transform (o ViewPort Transform) is the last operation performed before the "triangle setup" stage. The updated list of triangles is full of potentially visible primitives without back facing triangles. Vertices have (x, y, z) coordinates expressed in the "clip space" system of coordinates. They range between [−1, 1] and have been already projected.

The next stage, i.e., "triangle setup", implements some preliminary operations on the list of visible triangles to prepare and optimize the next rendering stage. In particular, coordinates need to be transformed from the "clip space" into the "screen space" related to the real screen resolution in order to properly run the rasterizer stage.

The triangle setup stage 112 performs a step that prepares the following rendering stage 113. In the triangle setup stage 112 operations on data from the geometry stage 111 are organized to compute a new set of data necessary for the next stage. Specifically, a new set of data is generated and associated with each vertex.

By way of example, an incremental scan conversion process can be implemented in the triangle setup stage 112: for each item in the list of triangles that are potentially visible and available from the geometry stage 111, the process locates each triangle over the pixel grid depending also on the z depth value associated to each vertex.

The rendering/rasterization stage 113 is one of the most complex stages from the computational viewpoint within the 3D graphic engine 110: in fact, the stage in question performs "per pixel" computations, that are typically iterated many times in order to provide the final appearance of each pixel actually displayed.

The order of the operations involved depends on the specific implementation. However, the outcome of the operations performed in the stages from 101 to 113 is finally supplied to a display frame device 130.

The description above highlights that the rendering stage 113 operates "per-pixel" and it is the stage in which the most part of the complexity of the pipeline resides. The workload on the rendering stage 113 affects the frame rate that can be achieved at the display 130: when the maximum workload that the rendering stage 113 can sustain is fixed, then the complexity of an application in term of number and type of primitives may temporarily exceed the fixed computational power, thus originating a variable time for rendering a frame and variable frame rate. This also occurs if algorithms with different complexities (such as various shading techniques) are used at different times.

Operations in the rendering/rasterization stage 113 comprise a shading operation that computes the color of each pixel composing the projected triangle. Different methods exist for implementing 3D shading. The most commonly used include: "flat shading", "Gouraud shading" and "phong shading". These methods span from low (flat) to high (phong) complexity and realism achieved.

More specifically, shading computes the color of each pixel that composes the projected triangle. A local reflection model is assumed to be available. Different methods are possibly used that work on a normal surface vector n of the current point, a vector v oriented toward the viewpoint and a vector I oriented toward the light source. Typically, a normal vector n is associated with each vertex of a triangle. Each triangle has a vertex list and a normal-per-vertex list. A set of triangles approximates a real surface and includes for each vertex a normal vector to the surface in this point. In other words, the surface is sampled through the vertices that approximate it.

There are different methods to implement 3D shading.

In flat shading each triangle has a unique color. If the normal is defined per triangle, then the color depends on it and on the local reflection model available. Since the normal is typically associated on a per vertex basis, the method computes on a single vertex (the first found in the list) a color that is then applied to all the pixels onto which the triangle is projected. This approach is very simple and the lighting equation is computed once per triangle. On the other side the quality is usually very poor since there is a color discontinuity between adjacent triangles.

Gouraud shading is a good compromise in order to produce a quasi-continuous color change within a triangle. Essentially, this approach:
- takes the vertex normals;
- computes the color for each vertex using the local reflection model;
- computes the color per each pixel within the triangle as a bilinear interpolation of the vertex colors.

If the normal is not available, it is possible to compute the vertex normal by using the average of the normals associated to adjacent polygons that share the same vertex. If the normals are the same, the method performs like "flat shading". "Gouraud shading" makes the color transitions between adjacent triangles smoother. It is simple and fast, being just a bit more complex than flat shading. However, specular reflections (highlights) are not rendered realistically.

Phong shading offers high realism if compared with previous methods. The vertex normals are interpolated inside the triangle. The interpolated normal is used in the local reflection model to compute the lighting equation for the color of each pixel inside the triangle. Phong shading captures specular reflections as it fully exploits the local reflection model per pixel. OpenGL does not support this approach since the normals are discarded after prospective projection.

Other possible operations include depth cueing, texture mapping, anti-aliasing and rasterization.

Depth cueing is useful in order to give a depth look to the rendered picture.

Texture mapping exploits the fact that reflection models are quite versatile. With a suitable selection of related parameters, different materials can be rendered in a quasi-realistic way. A limitation of shading lies in the impossibility of simulating very high details unless the model geometry is significantly modified. A way to solve this problem is to find a way to add details as a part of the rendering process itself. The methods considered here influence the shading process and are implemented as part of it. A method uses a bidimensional map, named texture map, in order to add details to an object surface.

A univocal correspondence between object and texture is needed. A texture is an image or a set of RGB colors. To compute the color of the surface at a certain point the correspondent color of a texture is used. This technique, also known as "color mapping", achieves good results as realism with a limited load from a computational point of view.

However, using "texture mapping" instead of introducing more details in the model definition has three basic advantages:
- this approach is local and not global;
- textures require memory space and a suitable selection algorithm; an alternative is to produce them as result of a procedural method; and
- use of texture introduces aliasing artifacts and requires means to dispense with them.

Texture-mapping needs a W( ) function for parametrization that associates a point of the texture (u,v) to a P point of the 3D surface (in other words it spreads the texture on the object surface). The point is mapped by the projection in a $(x_s, y_s)$ screen point.

Rendering of the texture defines the texture value to be associated to each pixel.

Rasterization (or Scan Conversion) draws the current frame with the colors computed by the shading by addressing pixel inside a frame segment and the one inside a triangle.

Two basic rasterization algorithms are:
- the Bresenham algorithm, which generates a sequence of pixels by using fixed arithmetic and choosing the pixel to be colored after the current one out of the 8 adjacent pixels;
- the scan-line algorithm, where pixels are chosen and colored by considering a scanline from top to bottom. A left-to-right scan is performed for each row and the triangles are filled between edges intersections to scan lines.

As indicated in the introductory portion of this application, when rendering a frame, due to the discrete nature of its rows and columns, aliasing will decrease the perceived quality.

Aliasing causes various artifacts in computer graphics as described, e.g., in E. Catmull: "A Hidden-Surface Algorithm With Anti-Aliasing", Proceedings of the 5th Annual Conference On Computer Graphics And Interactive Techniques, pp. 6-11, ACM Press, 1978 or F. C. Crow: "The Aliasing Problem In Computer-Generated Shaded Images", Communications of the ACM, 20(11): 799-805, 1977.

Such artifacts include:
- jagged edges
- small objects that appear/disappear in consecutive frames
- moiré pattern is periodic images
- small detail loss Aliasing artifacts can occur also over time (temporal aliasing, see J. Korein et al.: "Temporal Anti-Aliasing In Computer Generated Animation", Proceedings of the 10th Annual Conference On Computer Graphics And Interactive Techniques, pp. 377-388, 1983). The effects are typically visible when objects are rotating fast, like car gears that sometimes seem to rotate in the opposite direction or running slower than expected. This happens since the motion is not sampled properly from time to time. To reduce this, a motion blur technique is often used.

As already indicated, a solution for decreasing aliasing is to create the effect of an increased screen resolution. From a historical point of view this is the best solution: "Jaggies"

have dimensions not greater than the real pixel dimensions. By reducing the pixel dimension also those artifacts are minimized.

However, a resolution change is not always feasible. This may be due, for example, to the maximum resolution being already used or the application itself having a resolution limit. Then a viable solution for increasing the resolution as perceived by the user is to use sophisticated solutions that compute the final pixel color.

Even if anti-aliasing techniques have no well defined and widely accepted taxonomy, a well known classification defines them as pre-filtering techniques, post-filtering techniques and methods that use the so-called A-Buffer.

Pre-filtering methods remove image frequencies, greater than the Nyquist' frequency, before sampling the signal. This involves a low-pass filtering of the image and subsequent sampling. In other words, this approach computes the contribution of the area for each polygon for each pixel: this is the only method that notionally allows the artifacts to be removed completely because limits are imposed on the ideal spectrum before sampling.

Post-filtering methods consider the pixel coverage only at discrete points as an approximation of the exact area computation. This approach leads to methods that are very easy to implement in hardware form and are quite efficient in terms of real-time rendering. However, due their discrete nature, post-filtering methods cannot remove aliasing completely. They can appreciably increase the threshold value, at the frequency level, below which the aliasing artifacts are no longer visible.

While post-filtering methods can reduce artifacts, they cannot guarantee good results for all images.

If the real image spectrum is not limited, no over-sampling rate is great enough to avoid aliasing.

An increased, over-sampling frequency reduces artifacts visibility but is computationally heavy, while super-sampling is often simple and feasible. Super-sampling is often simpler and feasible than pre-filtering and this extensively contributed to their diffusion at the commercial level.

The area sampling method belongs to the class of pre-filtering techniques. Loss of details that fall between two samples suggests an approach called "un-weighted area sampling" that consists in integrating the signal over a square centered at each point of the picture grid, dividing the obtained value for the square area and using the result as the average intensity of the pixel considered. Pixels can be thought of as an array of non-overlapping squares. Each projection of an object contributes to the intensity of those pixels enclosed by its projection. This is in proportion to the area of each pixel that it covers, without considering its location within the pixel. Details cannot be lost, as is the case in simple point sampling. The main disadvantage of un-weighed area sampling lies in that a small object enclosed completely within a pixel that moves out of it causes a change on the image only when it intersects pixel edges. When an object moves far from the pixel center toward another pixel, this change will be represented in the image. In other words, the intensity of the pixel is weighed depending on the distance of the object from the pixel center. Weighed area sampling assigns different weights to the various parts of the pixels. In that way, the contribution of an object to pixel intensity depends on its distance from the pixel center. The best results are obtained in this case when the weighing function of pixels is overlapping in the middle and lower. Such overlapping allows having smoother transitions between the intensity of close pixels.

The super-sampling and multi-sampling methods are the simpler anti-aliasing techniques easy to implement in hardware form. The distinction between those methods is not well defined and some implementations can be regarded as belonging to both categories. Both methods however belong to the post-filtering category.

Super-sampling or FSAA (Full Scene Anti-Aliasing) renders the image at a higher resolution to be subsequently scaled to final dimension.

With multisampling, each pixel is sampled at different positions and these samples can be used to reconstruct a final value.

Both methods require more than one sample per pixel of the final image. For example, the 2× over-sampling perform rendering at two-fold resolution in order to obtain 2 sub-pixel samples for each output pixel; 4× FSAA does the same at four-fold resolution etc. Samples generated with over-sampling are combined with filtering techniques to mix those contributions with smoother edges.

The technique known as MSAA (Multi-Sampling Anti-Aliasing) is another alternative to traditional super-sampling used in FSAA. As in super-sampling, multisampling computes the scene at a higher resolution with a small difference by using texture samples for sub-pixel. For example 4× super-sampling generates 4 texels (texture elements) for each sub-pixel, while 4×MSAA generates a single texture for each sub-pixel.

Picture quality depends on the number and pattern of the samples taken for per each pixel. Unfortunately, both super-sampling and multi-sampling cannot completely remove aliasing; whatever the density of the sub-pixel grid, there can be always higher frequencies than samples can capture. If the signal is not subject to low-pass before rendering, the greater part of the images is affected by aliasing.

However, especially in real time rendering, both methods produce acceptable images, considering the low cost in performance and are used in most implementations of the anti-aliasing function in commercial systems.

Super-sampling can be summarized in the following steps:
i. creating an image at a resolution greater than the target resolution;
ii. low-pass filtering, and
iii. the filtered picture is re-sampled The first step is simple but requires memory and bandwidth. A further optimization consists in combining the steps ii) and iii) by generating a filtered picture only at points corresponding to new samples. A low-pass, "boxcar" type filter is easy to implement as the simple average of samples, but results are not satisfactory.

Sinc2 and Gaussian filtering produce better results. Sinc2 is the Fourier transform of a triangular function while Gaussian is a Fourier transform of itself. Both have strong attenuation far from the center and are fast to compute. A method that uses a Sinc2 filter is mostly known as bilinear filtering.

By increasing the number of samples, picture quality also increases but on the other hand the memory requirements also increase while overall performance effectiveness decreases. An accurate selection of sampling patterns is a crucial step in real cases. Regular sampling patterns (called OGSS, Ordered Grid Super Sampling) are not able to remove aliasing artifacts that are well visible to the human eye, which is sensitive to regular patterns. By using a regular grid, better results are obtained in terms of performance and memory requirements by selecting sampling points from a narrow subset of all possible sub-sample positions (for example by using n positions in an n×n grid).

This technique, called "sparse" sampling, uses a sampling grid that uses less memory and bandwidth. An example of this sampling is RGSS (Rotating Grid Super Sampling).

Stochastic sampling techniques are based on the assumption that the human visual system is more sensitive to regular aliasing patterns than to "noisy" patterns. Such a method can be used with ray-tracing, while ray-casting can be done easily everywhere inside the pixel area. Sampling is done using a random pattern. A Poisson pattern may be generated by adding random locations inside the grid. A Poisson disc is more costly to compute since limits exist on the relative distance between points. So the generation of a Poisson disc requires the storage of the location of each point. If a new point is added and the minimum distance test fails, then the point is dismissed and a new one is generated at a new position. A jitter pattern can be generated using a regular grid and moving each point by a random offset both in X and Y directions.

Fourier transforms of those patterns identify the noise distribution in the frequency domain of the image. Poisson pattern generate almost equal amounts of noise at low and high frequencies. However, the results may not be satisfactory since the noise at low frequency is visible more easily by the human visual system. A Poisson disc avoids the low frequency noise (but is more "expensive" to compute), while jittering techniques seem to offer a better price/performance ratio.

A-Buffer (anti-aliased, area-averaged, accumulation buffer) is a general technique for removing hidden surfaces with anti-aliasing. This technique solves the visibility problem in an arbitrary number of opaque, transparent and intersecting objects. One of the advantages of the techniques that use the A-Buffer lies in that they ignore the span of pixels covered completely by a polygon, in order to work only on edge pixels.

Exemplary for these types of "edge" anti-aliasing algorithms is the Z-Buffer technique, currently used in present-day graphic hardware. This technique solves easily the problem of detecting visible surfaces, but has several disadvantages. It does not manage transparent surfaces and is affected by aliasing. The article by Catmull cited in the foregoing introduces an improved algorithm that is accurate but is computationally heavy in terms of anti-aliasing and visible surface detection in the continuous domain: the polygon fragments that fall within a pixel are considered and the visible area of each fragment is computed. The values so obtained are used as weights to compute the final pixel color.

The algorithm, introduced by L. Carpenter in: "The A-Buffer, An Antialiased Hidden Surface Method", Proceedings of the $11^{th}$ Annual Conference On Computer Graphics And Interactive Techniques, pp. 103-108, 1984 combines the Z-Buffer with the effects of the antialiasing of the Catmull algorithm. In this A-Buffer algorithm, the exact computation of the area is approximated by using the discrete sub-pixel samples filtered with a box filter. This approach is easier to implement and quite efficient in hardware terms, since, e.g., a sub-fragment area defined with a 4×8 bit mask can be computed using simple logic operations (XOR) instead of the floating point needed by the analytical methods.

The A-Buffer keeps memory-concatenated lists of internal fragments at each pixel. The fragments are ordered in a "front to back" order to manage transparency. To each fragment an object tag is associated for efficient processing: if two fragments are overlapped in the z direction, then they belong to same objects and are then merged to save memory.

In addition to the minimum z value, for each fragment the method also keeps the maximum z value in order to approximate the rendering of intersecting surfaces. This approximation assumes that the fragments have opposite inclinations. Sometimes the method may thus fail and the rendering is not correct. After the fragments are processed, their contributions to the final pixel color are computed by using as weights the values of the sub-pixel mask.

A disadvantage of the A-Buffer algorithm, related to its hardware implementation, lies in that there are no limits to the dimensions of the list of the potentially visible fragments per pixel. Additionally, the computational load associated with each pixel is not known at an early stage. While hardware implementations exist, the A-Buffer technique is mostly adapted for software implementation in high quality rendering and has been used successfully by the Computer Division of Lucasfilm Ltd. (today Pixar) to produce computer-generated films.

The EXACT (EXact Area CalculaTion) algorithm proposed by A. Schilling et al. in: "Exact: Algorithm And Hardware Architecture For An Improved A-Buffer", Proceedings of the $20^{th}$ Annual Conference On Computer Graphics And Interactive Techniques, pp. 85-91, ACM Press, 1993, solves the A-Buffer problem related to the intersecting surfaces managing by introducing priority masks, which keep track of what surfaces are visible in each part of the sub-pixel mask. Priority masks are used to modify the coverage masks if needed. This approach manages correctly anti-aliasing in all cases of intersecting surfaces.

The article by S. Winner, et al.: "Hardware Accelerated Rendering Of Antialiasing Using A Modified A-Buffer Algorithm", Proceedings of the $24^{th}$ Annual Conference On Computer Graphics And Interactive Techniques, pp. 307-316, AMC Press/Addison-Wesley Publishing Co., 1997, offers order-independent anti-aliasing and transparency, but can require multiple rendering passes. If there are n primitives per pixel that cannot be combined, n passes are required. The advantage of this modified A-Buffer algorithm is that it does not require extra memory and typically changes by 40% performance versus non-anti-aliased cases. To compute the fragment coverage a 4×4 sub-pixel mask is used with 8 sampling positions. The screen is partitioned in blocks of 16×32 pixels that are processed one at a time. This optimization of memory usage allows the Z-buffer and the frame buffer to be stored on chip leading to a more efficient computation, while compromising performance by an acceptable value when compared to arrangements where anti-aliasing is not used.

N. P. Jouppi et al. propose in: "Z3: An Economical Hardware Technique For High-Quality Antialiasing And Transparency", Proceedings of the 1999 Eurographics/SIGGRAPH Workshop On Graphics Hardware, pp. 85-93, AMC Press, 1999 a hardware technique of the A-Buffer type that uses a fixed quantity of added memory per pixel. This effectively performs anti-aliasing and makes transparency "order-independent". Compared to the basic A-Buffer algorithm, Z3 manages correctly the intersecting transparent surfaces. Z3 keeps track only of a fixed quantity of sub-pixel fragments for each pixel. This makes hardware design easier since the memory requirements are well known and predictable. In addition to the normal z values, also the z slopes are saved in both x and y directions for each fragment. The name Z3 derives from the fact that tri-dimensional z information is used for each fragment. Keeping track of the gradients is advantageous since there are many cases where the z information can cause error in the anti-aliasing and visibility procedure.

The R-buffer (Re circulating fragment buffer) technique, introduced in C. M. Wittenbrink et al.: "R-buffer: A Pointerless A-Buffer Hardware Architecture", Proceedings of The ACM SIGGRAPH/EUROGRAPHICS Workshop On Graphics Hardware, pp. 73-80, ACM Press, 2001, is a hardware solution for order-independent transparency with an arbitrary number of levels, that supports A-buffer anti-aliasing. The R-buffer is a buffer managed as a circular FIFO, different from the Z-buffer and frame buffer, that stores all fragments not enclosed in the Z-buffer for a given pixel. These buffers are stored in the same on-chip memory of the hardware accelerator. Circular management of the buffer simplifies hardware design, since dynamic memory allocation is not supported. By adding a R-buffer, control and compare logic, some bits and an additional z value for each pixel, it is possible solve transparency problems that are order-independent. A state machine is associated with each pixel to compose transparent and opaque fragments. Depending on the opacity and depth of the fragment and the previous state of frame buffer for the same position, a fragment can be stored in the R-buffer, composed in the frame buffer, or not used. The final composition of fragments to compute transparency and anti-aliasing requires multiple rendering passes.

Insofar as the associated hardware is concerned, the FAA-16× technology used by Matrox Parhelia-512 is based on the assumption that the percentage of pixels that composes the scene and that really needs anti-aliasing is between 5 and 10% on the average. FAA-16× cleverly identifies fragments to be sent to the anti-aliasing unit by inspecting only triangle edges and the computing coverage with 16× accuracy. A pixel can be classified as totally, partially or absolutely not covered. This information can be used to ascertain if a pixel must be rejected (if not covered by a triangle), written into the frame buffer (if covered) or sent to the anti-aliasing unit FAA-16× (if partially covered). All pixels that are not fragmented are immediately copied into the frame buffer, while fragmented data are saved in a special fragment buffer. The fragment buffer contains also a list of information items related to all the fragmented pixels, and in particular contains the coverage and color of sub-pixels. The FAA-16× unit updates continuously the fragment buffer to determine the final representation of scene fragments. The fragments are blended at the end and the resulting pixels are written into the frame buffer to complete the image.

The ATI SmoothVision technology as introduced in 2001 uses groups of 16 samples, which are divided in a variable number of pixels, depending on the antialiasing effect needed. In the 2× mode, samples cover 8 pixels, in the 4× mode they cover 4 pixels and so on. Each pixel has 8 preprogrammed alternatives of "jittered" positions of sampling points, which give to the sampling pattern a pseudo-casual shape. In that way, images look better from the point of view of the human visual system, which is more sensitive to regular patterns. Being a super-sampling technique, SmoothVision performs texturing information look-up at each sampling point rather than one time per pixel.

The RealityEngine graphic architecture by SGI, as described in K. Akeley: "Reality Engine Graphics", Proceedings of 20$^{th}$ Annual Conference On Computer Graphics And Interactive Techniques, pp. 109-116, ACM Press, 1993 uses super-sampling with a 4×4 regular grid that is not effective from the point of view of performance and quality. Reality-Engine selects between two sampling techniques: point sampling and area sampling.

The InfiniteReality architecture, introduced in J. S. Montrym, et al. in: "Infinitereality: A Real-Time Graphics System", Proceedings of 24$^{th}$ Annual Conference On Computer Graphics And Interactive Techniques, pp. 293-302, ACM Press/Addison-Wesley Publishing Co., 1997, has been designed with the purpose of implementing OpenGL fully in hardware. For anti-aliasing purposes it uses a sparse 8×8 super-sampling: each primitive is sampled at 1, 4 or 8 of the 64 possible positions. The z information of all sub-samples is stored to compute accurately the visible surfaces.

In the 2× multi-sampling mode of GeForce 3 and 4 of NVIDIA, the image is rendered with two separate positions in the frame buffer. The sampling points are moved by an offset equal to half a pixel between two sampling passes. Those samples are then filtered to obtain final colors for the pixel. In the normal model, only one sample per pixel is used. In a quincunx mode, during one pass a sample is filtered with four other samples (taps) taken from the previous sampling pass. In the Accuview method, implemented in GeForce 4, the sampling positions are moved slightly to obtain a more accurate sampling. This technique exists also in a 4× version.

BRIEF SUMMARY OF THE INVENTION

One embodiment of the present invention provides a graphic engine arrangement adapted to reduce aliasing artifacts in computer graphics.

One embodiment of the present invention provides an OPENGL-ES compliant arrangement for embedded computing mobile devices able to achieve full screen anti-aliasing with no negative impact in terms of i) communication bandwidth between the graphic pipeline and the memory in comparison with arrangements where no anti-aliasing is used, and ii) memory size.

One embodiment of the present invention is a method having the characteristics referred to specifically in the claims that follow. One embodiment of the invention also relates to a corresponding system, as well as a computer program product loadable in the memory of at least one computer and comprising software code portions for performing the method of the invention when the product is run on a computer.

A preferred embodiment of the arrangement described herein involves:
 the generation, for each pixel, of two sub-pixels placed on pixel edges during the rasterization step,
 compression of those sub-pixels to the same size of an uncompressed pixel and stored in the main memory, and
 when the pixels are read from memory, at least one of:
  feeding the graphic pipeline for further processing after the pixels have been decompressed to the original uncompressed size, and
  feeding the graphic pipeline for further display after the pixels have been decompressed to retrieve the two sub-pixels at the uncompressed size.

Preferably, median filters are applied to the sub-pixels to create a new plurality of sub-pixels. Then by combining in a linear or non-linear way, the de-compressed sub-pixels and the newly created sub-pixels, other new sub-pixels are generated and finally averaged to give the final anti-aliased pixels to be sent to the display unit.

BRIEF DESCRIPTION OF THE SEVERAL VIEWS OF THE DRAWINGS

The invention will now be described, purely by way of non-limiting example, with reference to the annexed figures of drawing, wherein.

DETAILED DESCRIPTION OF THE INVENTION

As an example, the rendering process of a set of triangles received in a generic order as submitted by an application will be considered.

For each triangle, the rendering algorithm will compute the color of a set of pixels of the image that represents the shape and the colors of the original triangle.

The image is assumed to be totally comprised of width-by-height pixels. Each triangle can color a higher or lower amount of these pixels. Each pixel in the image is a set of Red, Green, Blue and Alpha (RGBA) components each including n (in a known manner) bits (typically n=8).

Figure 1:
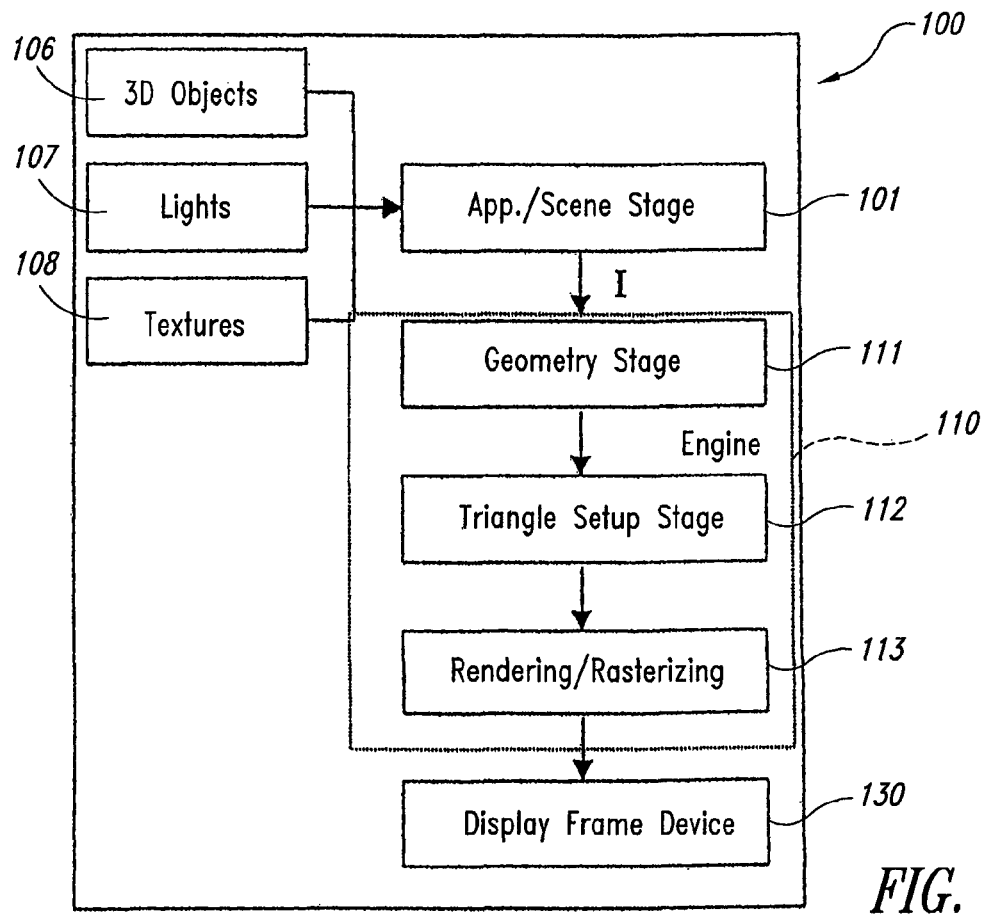
FIG. 1 has already been described in the foregoing.

For each triangle the rasterization stage 113 of FIG. 1 will compute from its 3 vertices the RGBA values of each pixel that fall inside the triangle (i.e., primitive) area.

The arrangement described herein is based on the following steps.

Figure 2:
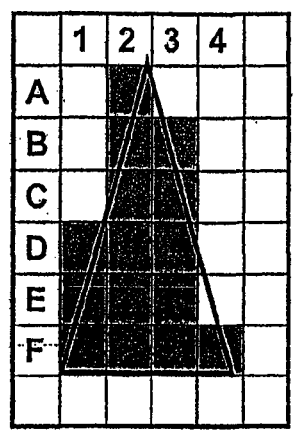
FIG. 2 shows sample of image processed according to the arrangement described herein.

First of all, for each triangle received from the application and during the rasterization step, all the pixels that fall inside the triangle area are located as shown in FIG. 2 with grey color;

Then for each pixel (D1 E1 F1 A2 B2 C2 D2 E2 F2 B3 C3 D3 E3 F3 F4 in example) two new sub-pixels are computed.

Figure 3A:
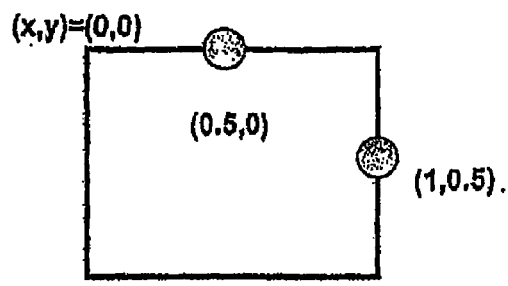
FIGS. 3a and 3b show two possible alternatives in the definition of sub-pixels in the arrangement described herein.

These two sub-pixels are placed on the pixel edges and their positions are shown in FIG. 3a as a preferred example defined by their (x,y) positions (0.5,0), and (1,0.5) respectively.

The RGBA components of the two sub-pixels are computed by the rasterization component, and then the two sub-pixels are compressed with a compression method. Exemplary of such compression is the arrangement described in U.S. Patent Application Publication No. 2004/120594. This arrangement performs compression/decompression as a conversion between a first format and a second format, the second format being a format compressed via vector quantization. Vector quantization results from repeated application of a scalar quantizer with a quantization step determined in an adaptive way. The arrangement in question takes for each sub-pixel one of the colors (the same applies to the R, G, B and alpha components) coded at 8 bits and compresses two of them to a total of 8 bits.

The compression of two RGBA sub-pixels will produce the same amount of bits of an uncompressed pixel. For example, if two sub-pixels (RGBA) are coded with 32 bits each (64 bits in total), then the compressed word will include 32 bits in total.

Figure 4:
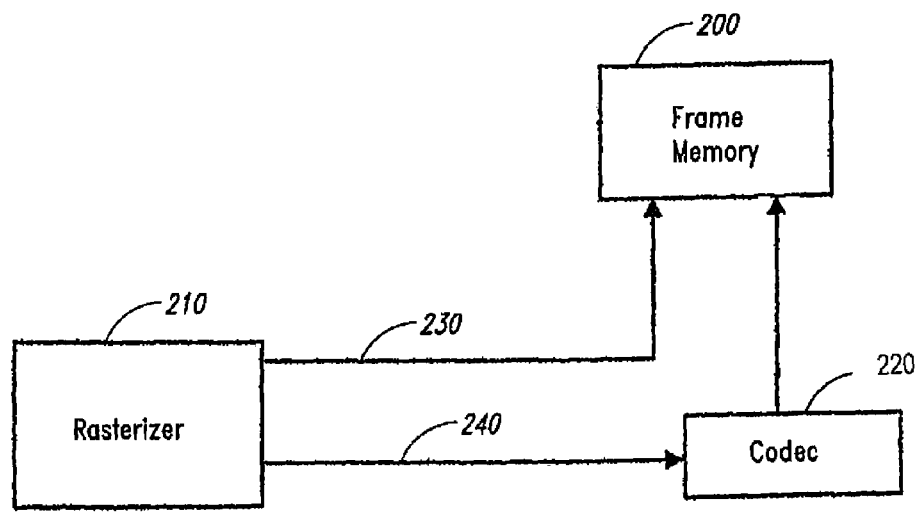
FIG. 4 is a block diagram of a write operation into a frame buffer at the output of a rasterizer in the arrangement described herein.

A simple block diagram during the writing operation is shown in FIG. 4, where 200 indicates the frame memory block, 210 indicates the rasterizer block, 220 indicates the codec block.

The rasterizer block 210 outputs:

the address location 230 where the sub-pixels are written in the frame buffer 200;

the pixel information 240 that can be comprised of two sub-pixels.

The address 230 is used to find the location in the frame memory 200 where the two sub-pixels compressed by the codec block 220 are written. The compressed word is stored in the frame buffer at a location depending on the pixel coordinate on the image.

When read, any location of the frame buffer is de-compressed in order to generate two sub-pixels each comprised of R, G, B and alpha components. Access to the frame buffer can occur basically for two reasons: in order to use such information for further display or for further processing by the graphic pipeline, such as, e.g., blending with semi-transparent objects. The word read is decompressed in order to generate two sub-pixel each made of R, G, B and alpha components.

Figure 5:
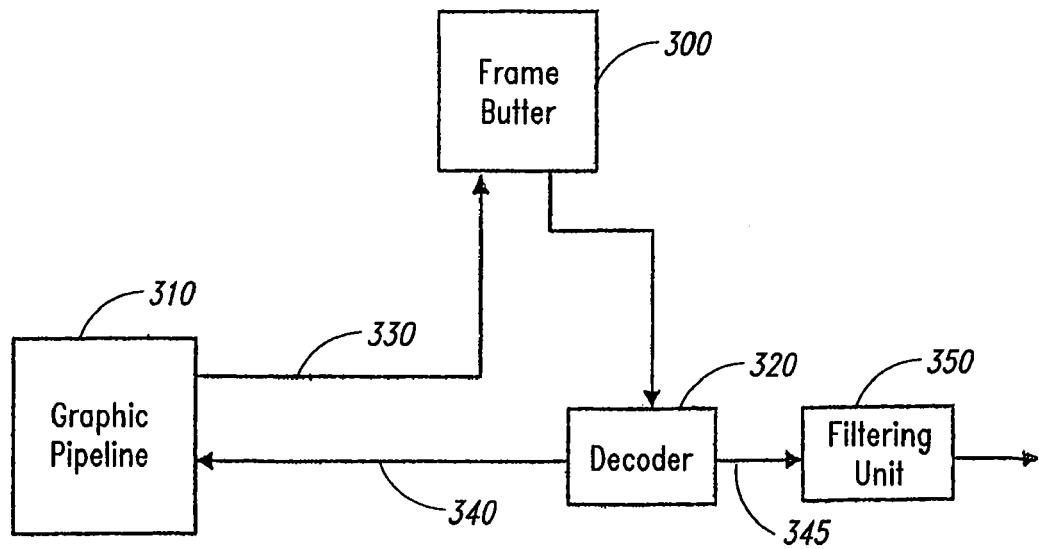
FIG. 5 is a block diagram of a read operation in the arrangement described herein.

FIG. 5 shows a block diagram during the read operation from the frame. Read events can be dictated by further processing of sub-pixels in the graphic pipeline or for related display.

The graphic pipeline 310 issues the address 330 where the pixel 340 is read from the frame buffer 300. The decoder 320 decompresses the information read from the frame buffer and produces at the output two decompressed sub-pixels 340 and 345. That information can be sent to the graphic pipeline 310 and/or the filtering unit 350.

Figure 6:
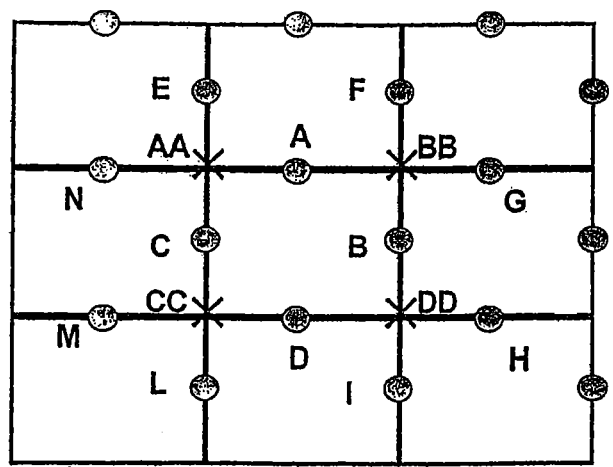
FIG. 6 shows operation of a filtering unit in the arrangement described herein.

The filtering unit 350 operates as shown in FIG. 6. For each pixel to be produced at the output will:

borrow two sub-pixels from neighboring pixels, create, by using adaptive filters, new sub-pixels, named AA, BB, CC, DD, and apply a (median) filter to the sub-pixels above in order to compute the final pixel to be sent to the display.

The latter step mentioned above is detailed below in pseudo-code language.

Compute AA:

```
If (distance(A,D)<=distance(C,B)) and
   (distance(A,D)<=distance(A,C))
Then AA=median(E,N,C)
Else
If (distance(C,B)<=distance(A,D)) and
   (distance(C,B)<=distance(A,C))
Then AA=median(E,N,A)
Else
If (([distance(A,C)+distance(B,D)]/2<=distance(A,D)) and
   ([distance(A,C)+distance(B,D)]/2 <= distance(C,B))) or
   (([distance(A,B)+distance(C,D)]/2<=distance(A,D)) and
   ([distance(A,B)+distance(C,D)]/2 <= distance(C,B)))
Then AA=(A+C+N+E)/4
```

Where the distance between two pixels can be:

square root of ((Red pixel1−Red pixel2)*(Red pixel1−Red pixel2)+(Green pixel1−Green pixel2)*(Green pixel1−Green pixel2)+(Blue pixel1−Blue pixel2)*(Blue pixel1−Blue pixel2))

or (absolute value(Red pixel1−Red pixel2)+absolute value (Green pixel1−Green pixel2)+absolute value (Blue pixel1−Blue pixel2))

The median value of three pixels is a new pixel composed by R, G, B components where:

Red component is the median value of (Red pixel1, red pixel 2, red pixel3)

Green component is the median value of (Green pixel1, green pixel 2, green pixel3)

Blue component is the median value of (Blue pixel1, blue pixel 2, blue pixel3)

Compute BB:

```
If (distance(A,D)<=distance(C,B)) and
    (distance(A,D)<=distance(A,B))
Then BB=median(F,G,B)
Else
If (distance(C,B)<=distance(A,D)) and
    (distance(C,B)<=distance(A,B))
Then BB=median(F,G,A)
Else
If [distance(A,C)+distance(B,D)]/2<=distance(A,D) and
   [distance(A,C)+distance(B,D)]/2 <= distance(C,B) or
   [distance(A,B)+distance(C,D)]/2<=distance(A,D) and
   [distance(A,B)+distance(C,D)]/2 <= distance(C,B)
Then BB=(A+F+B+G)/4
```

Compute CC:

```
If distance(A,D)<=distance(C,B) and distance(A,D)<=distance(C,D)
Then CC=median(C,M,L)
Else
If distance(C,B)<=distance(A,D) and distance(C,B)<=distance(C,D)
Then CC=median(M,L,D)
Else
If [distance(A,C)+distance(B,D)]/2<=distance(A,D) and
   [distance(A,C)+distance(B,D)]/2 <= distance(C,B) or
   [distance(A,B)+distance(C,D)]/2<=distance(A,D) and
   [distance(A,B)+distance(C,D)]/2 <= distance(C,B)
Then CC=(C+M+L+D)/4
```

Compute DD:

```
If distance(A,D)<=distance(C,B) and distance(A,D)<=distance(B,D)
Then DD=median(B,H,I)
Else
If distance(C,B)<=distance(A,D) and distance(C,B)<=distance(B,D)
Then DD=median(H,I,D)
Else
If [distance(A,C)+distance(B,D)]/2<=distance(A,D) and
   [distance(A,C)+distance(B,D)]/2 <= distance(C,B) or
   [distance(A,B)+distance(C,D)]/2<=distance(A,D) and
   [distance(A,B)+distance(C,D)]/2 <= distance(C,B)
Then DD=(B+D+I+H)/4
```

The third step mentioned above will now be detailed as follows, where two cases are envisaged:

Case 1:
the following sub-pixels A, B, C, D, AA, BB, CC, DD are each multiplied by a different coefficient, added together and the sum is divided by the sum of all coefficients used Case 2:
the maximum (or minimum) distance between (A, D), (C, B), (AA, DD), (BB, CC) is found and then the final pixel if the average of the above sub-pixel pair found as maximum (or minimum). Now more details are given about Case 1.

Figure 7:
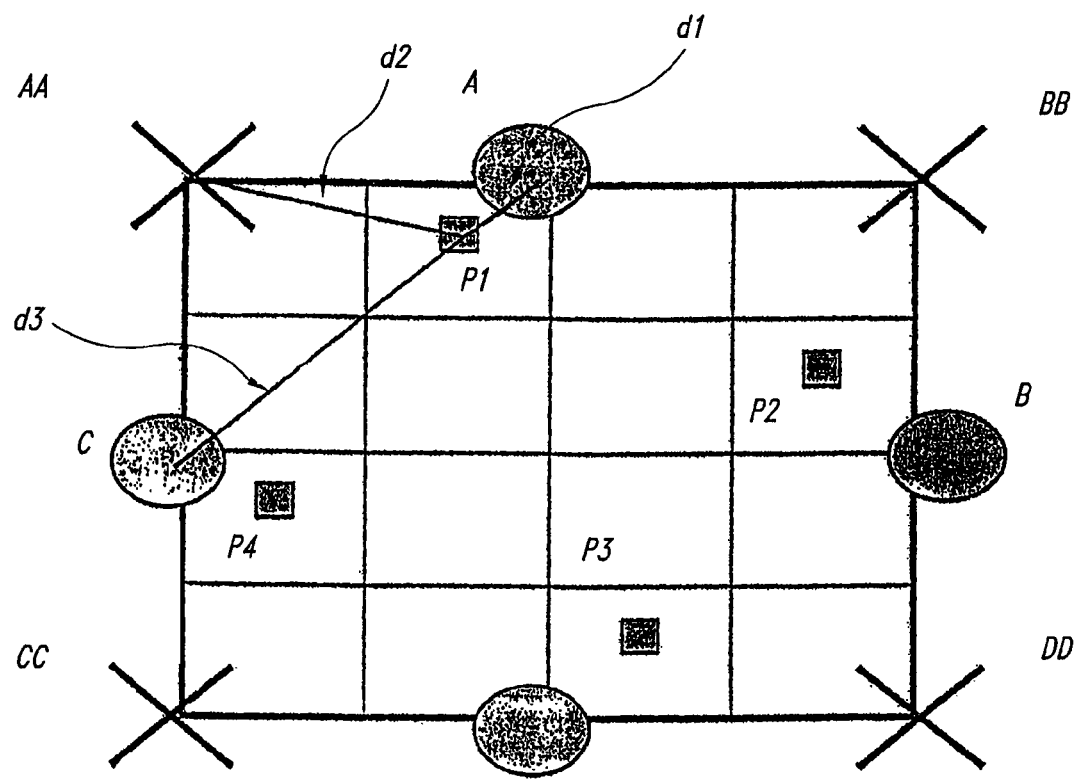
FIG. 7 shows a grid with selected pixels, in the arrangement described herein.

Referring to FIG. 7, P1, P2, P3, P4 are the sub-samples located at the same place as were generated by the RGSS 4× algorithm.

Step 3, case 1 will create them as linear combination of the sub-sample generated during step 2.

For instance:

$$P1 = 1/d1*A + 1/d2*AA + 1/d3*C/(1/d1 + 1/d2 + 1/d3)$$

$$P2 = 1/d1*B + 1/d2*BB + 1/d3*A/(1/d1 + 1/d2 + 1/d3)$$

$$P3 = 1/d1*D + 1/d2*DD + 1/d3*B/(1/d1 + 1/d2 + 1/d3)$$

$$P4 = 1/d1*C + 1/d2*CC + 1/d3*D/(1/d1 + 1/d2 + 1/d3)$$

and the pixels sent to the display will be the average of P1, P2, P3, P4.

Figure 8:
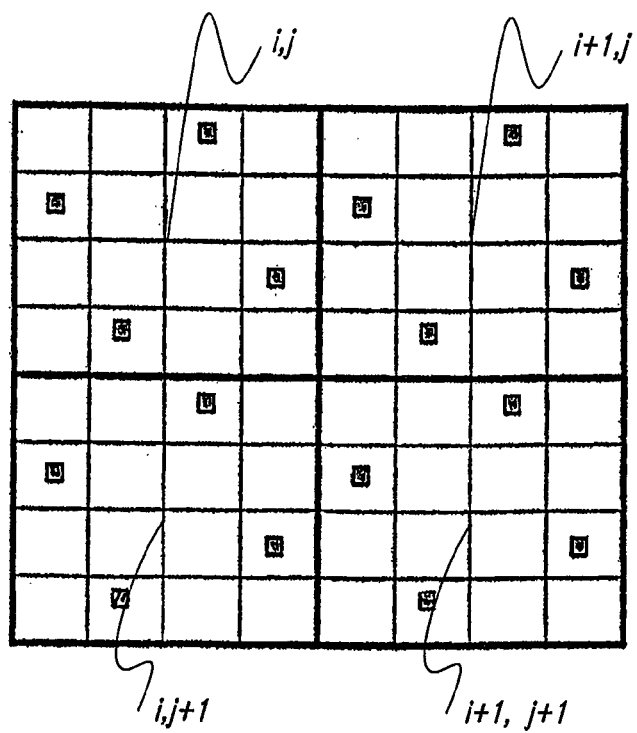
FIG. 8 shows the process of composing the grid of FIG. 7.

FIG. 8 shows how for each pixel position (i, j) the grid shown in FIG. 7 is "composed by sub-pixel".

Another option to interpolate AA, BB, CC, DD pixels is to use for each of them, four very close and surrounding sub-pixels, and see what image surface shape they represent. There are fourteen of these, in example, corresponding to fourteen possible surface shapes.

For example for AA interpolation, four values A=a, N=b, C=c, E=d can be considered in the following situations.

| Number | Shape | type | | AA is equal to |
|---|---|---|---|---|
| 0 | Flat | a a | a a | a |
| 1 | High | a a | a b | a |
| 2 | Line | a b | b a | a or b |
| 3 | Aligned | a a | b b | (a + b)/2 |
| 4 | Low | a b | b b | b |
| 5 | Twisted edge | a a | b c | (a + b)/2 |
| 6 | Valley | a b | c a | a or (a + b)/2 |
| 7 | Edge | a b | b c | b |
| 8 | Double twisted edge | a b | c b | (a + b)/2 or (b + c)/2 b often better |
| 9 | Twisted edge | a b | c c | (b + c)/2 |
| 10 | Ridge | a c | c b | c or (b + c)/2 |
| 11 | Edge | a b | c d | (b + c)/2 |
| 12 | Double twisted edge | a b | d c | (a + c)/2 or (b + d)/2 or (b + c)/2 is better |
| 13 | Line | a c | d b | (a + b)/2 or (c + d)/2 |

Figure 3B:
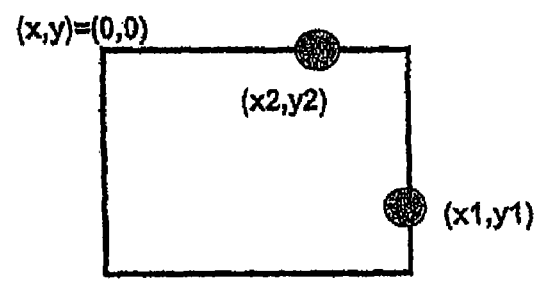

FIG. 3b shows, by way of further example, a possible alternative to locate the two sub-sample positions per each pixel in any position of the pixel edge.

Therefore, without prejudice to the underlying principles of the invention, the details and embodiments may vary, also significantly, with respect to what has been described, by way of example only, without departing from the scope of the invention as defined in the claims that follow.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A method, comprising:
    under control of a computing device, rendering a primitive of an image to be displayed, the primitive having an area and the rendering including:
    locating pixels that fall within the area of said primitive; and
    for each pixel located in said area, generating a set of associated sub-pixels of the pixel, the sub-pixels comprised of color components;

creating an adaptively filtered set of sub-pixels for the pixel by adaptively filtering said set of associated sub-pixels and a set of neighboring sub-pixels of one or more neighboring pixels adjacent to the pixel, wherein the creating the adaptively filtered set of sub-pixels includes computing each of the sub-pixels of the adaptively filtered set based at least in part on determining distances between at least some of the sub-pixels of the set of associated sub-pixels and sub-pixels of the set of neighboring sub-pixels, the distances being based on the color components of the at least some of the sub-pixels of the set of associated sub-pixels and sub-pixels of the set of neighboring sub-pixels;

computing a final pixel for display by subjecting said adaptively filtered set of sub-pixels to further filtering; and displaying the final pixel on a display of the computing device.

2. The method of claim 1, wherein said primitive is a triangle.

3. The method of claim 1, wherein each pixel includes a set of red, green, blue, and alpha components.

4. The method of claim 1, wherein said step of locating the pixels that fall within the primitive area is performed as a rasterization step.

5. The method of claim 1, wherein said set of associated sub-pixels is generated by a rasterization algorithm.

6. The method of claim 1, wherein said set of associated sub-pixels fulfils at least one of the following:
the set includes two associated sub-pixels; and
the set includes associated sub-pixels placed on pixel edges.

7. The method of claim 1, wherein the generating the set of associated sub-pixels further includes compressing the sub-pixels in said set of associated sub-pixels, and wherein the creating the adaptively filtered set of sub-pixels further includes decompressing at least one set of associated sub-pixels.

8. The method of claim 7, wherein the compressing the sub-pixels in said set of associated sub-pixels further includes converting the sub-pixels between a first format and a second format, said second format being a format compressed via vector quantization, wherein said vector quantization includes repeatedly applying a scalar quantizer with a quantization step determined in an adaptive way.

9. The method of claim 7, wherein each sub-pixel includes a set of red, green, blue, and alpha components and said compressing includes taking, for each sub-pixel, two of said components and compressing these two components to an amount of bits equal to an amount of bits of an uncompressed sub-pixel component.

10. The method of claim 1 further comprising, between said steps of generating a set of associated sub-pixels and said step of adaptively filtering, the step of storing said associated sub-pixels in a frame buffer.

11. The method of claim 10, further comprising compressing the sub-pixels in said set of associated sub-pixels, wherein the storing step includes storing said associated sub-pixels in the frame buffer in a compressed format resulting from said compressing.

12. The method of claim 11, further comprising:
reading said associated sub-pixels from said frame buffer; and at least one of the steps of:
further processing information related to said associated sub-pixels in a graphic pipeline, and
decompressing said associated sub-pixels in order to generate corresponding uncompressed sub-pixel information.

13. The method of claim 1, wherein said adaptively filtering step includes, for a first sub-pixel of said adaptively filtered set, the operations of computing said first sub-pixel by:

If (distance(A,D)<=distance(C,B)) and (distance(A,D)<=distance(A,C))

Then AA=median(E,N,C)

Else

If (distance(C,B)<=distance(A,D)) and (distance(C,B)<=distance(A,C))

Then AA=median(E,N,A)

Else

If (([distance(A,C)+distance(B,D)]/2<=distance(A,D)) and
([distance(A,C)+distance(B,D)]/2<=distance(C,B))) or
((([distance(A,B)+distance(C,D)]/2<=distance(A,D)) and
([distance(A,B)+distance(C,D)]/2 distance(C,B)))

Then AA=(A+C+N+E)/4 where AA is said first sub-pixel, A, B, C, and D are the sub-pixels of said set of associated sub-pixels, and E and N are sub-pixels in said set of neighboring sub-pixels, while median and distance are median and distance operators.

14. The method of claim 13, wherein said adaptively filtering step includes, for a second sub-pixel of said adaptively filtered set, the operations of computing said second adaptively filtered sub-pixel by:

If (distance(A,D)<=distance(C,B)) and (distance(A,D)<=distance(A,B))

Then BB=median(F,G,B)

Else

If (distance(C,B)<=distance(A,D)) and (distance(C,B)<=distance(A,B))

Then BB=median(F,G,A)

Else

If [distance(A,C)+distance(B,D)]/2<=distance(A,D) and [distance(A,C)+distance(B,D)]/2<=distance(C,B) or
[distance(A,B)+distance(C,D)]/2<=distance(A,D) and [distance(A,B)+distance(C,D)]/2 distance(C,B)

Then BB=(A+F+B+G)/4 where BB is said second sub-pixel, and F and G are sub-pixels of said set of neighboring sub-pixels.

15. The method of claim 14, wherein said adaptively filtering step includes, for a third sub-pixel of said adaptively filtered set, the operations of computing said third sub-pixel by:

If distance(A,D)<=distance(C,B) and distance(A,D)< =distance(C,D)

Then CC=median(C,M,L)

Else

If distance(C,B)<=distance(A,D) and distance(C,B)<=distance(C,D)

Then CC=median(M,L,D)

Else

If [distance(A,C)+distance(B,D)]/2<=distance(A,D) and [distance(A,C)+distance(B,D)]/2<=distance(C,B) or
[distance(A,B)+distance(C,D)F2<=distance(A,D) and [distance(A,B)+distance(C,D)]/2 distance(C,B)

Then CC=(C+M+L+D)/4 where CC is said third sub-pixel, and M and L are sub-pixels of said set of neighboring sub-pixels.

16. The method of claim 15, wherein said adaptively filtering step includes, for a fourth sub-pixel of said adaptively filtered set, the operations of computing said fourth sub-pixel by:

If  distance(A,D)<=distance(C,B)  and  distance(A,D)<=distance(B,D)
Then DD=median(B,H,I)
Else
If  distance(C,B)<=distance(A,D)  and  distance(C,B)<=distance(B,D)
Then DD=median(H,I,D)
Else
If [distance(A,C)+distance(B,D)]/2<=distance(A,D) and [distance(A,C)+distance(B,D)]/2<=distance(C,B) or [distance(A,B)+distance(C,D)]/2<=distance(A,D) and [distance(A,B)+distance(C,D)]/2 distance(C,B)
Then DD=(B+D+I+H)/4
where DD is said fourth sub-pixel, and H and I are sub-pixels of said set of neighboring sub-pixels.

17. The method of claim 13, wherein each sub-pixel includes a set of red, green, blue, and alpha components and the median of three sub-pixels is a new sub-pixel composed by red, green, and blue components where:
the red component of the new sub-pixel is the median of the red components of the three sub-pixels;
the green component of the new sub-pixel is the median of the green components of the three sub-pixels; and
the blue component of the new sub-pixel is the median of the blue components of the three sub-pixels.

18. The method of claim 13, wherein each sub-pixel includes a set of red, green, and blue components and the distance between two of the sub-pixels is defined as:
square root of ((Red pixel1−Red pixel2)*(Red pixel1−Red pixel2)+(Green pixel1−Green pixel2)*(Green pixel1−Green pixel2)+(Blue pixel1−Blue pixel2)*(Blue pixel1−Blue pixel2)), wherein Red pixel1, Green pixel1, and Blue pixel1 are the red, green, and blue components of a first one of the two sub-pixels and Red pixel2, Green pixel2, and Blue pixel2 are the red, green, and blue components of a second one of the two sub-pixels.

19. The method of claim 13, wherein each sub-pixel includes a set of red, green, and blue components and the distance between two of the sub-pixels is defined as:
absolute value (Red pixel1−Red pixel2)+absolute value (Green pixel1−Green pixel2)+absolute value (Blue pixel1−Blue pixel2), wherein Red pixel1, Green pixel1, and Blue pixel1 are the red, green, and blue components of a first one of the two sub-pixels and Red pixel2, Green pixel2, and Blue pixel2 are the red, green, and blue components of a second one of the two sub-pixels.

20. The method of claim 1, wherein said step of computing the final pixel for display includes:
obtaining multiplication results by multiplying each of the sub-pixels of said set of associated sub-pixels, said set of neighboring sub-pixels, and said adaptively filtered set of sub-pixels by respective coefficients;
obtaining a first sum by adding together the multiplication results;
obtaining a second sum by adding together the coefficients; and
dividing the first sum by the second sum.

21. The method of claim 1, wherein said step of computing the final pixel for display includes:
determining a maximum or minimum sub-pixel pair by finding either a maximum or a minimum distance between (A, D), (C, B), (AA, DD), (BB, CC), where (A, B, C, D) are the sub-pixels of said set of associated sub-pixels and said set of neighboring sub-pixels while (AA, BB, CC, DD) are the sub-pixels of said adaptively filtered set of sub-pixels; and
computing the final pixel as an average of the sub-pixels of the maximum or minimum sub-pixel pair.

22. The method of claim 1, wherein said step of computing a final pixel for display includes interpolating the sub-pixels of said adaptively filtered set of sub-pixels by using for each of them, four close surrounding sub-pixels.

23. A system for rendering a primitive of an image to be displayed, the primitive having an area, the system comprising:
locating means for locating pixels that fall within the area of said primitive;
generating means for generating for each said pixel located in said area a set of associated sub-pixels of the pixel, the sub-pixels comprised of color components;
adaptive filtering means for creating for each of the pixels a respective adaptively filtered set of sub-pixels for the pixel by adaptively filtering said set of associated sub-pixels and a set of neighboring sub-pixels of one or more neighboring pixels adjacent to the pixel, wherein the adaptive filtering means is configured to compute each of the sub-pixels of the respective adaptively filtered set at least in part by determining distances between at least some of the associated sub-pixels and neighboring sub-pixels, the distances being based on the color components of the at least some of the associated sub-pixels and neighboring sub-pixels;
computing means for computing for each of the pixels a final pixel for display by subjecting said respective adaptively filtered set of sub-pixels of the pixel to further filtering; and
a frame buffer memory for storing for each of the pixels said respective set of associated sub-pixels.

24. The system of claim 23, wherein the primitive is a triangle.

25. The system of claim 23, wherein each pixel includes a set of red, green, blue and alpha components.

26. The system of claim 23, wherein the locating means include a rasterizer module configured for locating the pixels that fall within said primitive area.

27. The system of claim 23, wherein the generator means include a rasterizer module configured for generating said set of associated sub-pixels.

28. The system of claim 23, wherein said set of associated sub-pixels fulfils at least one of the following:
the set includes two associated sub-pixels; and
the set includes associated sub-pixels placed on pixel edges.

29. The system of claim 23, further comprising a processing module configured for compressing the sub-pixels in said set of associated sub-pixels.

30. The system of claim 29, wherein said processing module is configured for converting the sub-pixels in said set between a first format and a second format, said second format being a format compressed via vector quantization, wherein said vector quantization results from repeated application of a scalar quantizer with a quantization step determined in an adaptive way.

31. The system of claim 29, wherein each sub-pixel includes a set of red, green, blue and alpha components and said processing module is configured for taking for each sub-pixel two of said components and compressing these two components to an amount of bits equal to an amount of bits of an uncompressed sub-pixel component.

32. The system of claim 23, further comprising a processing module configured for producing compressed sub-pixels by compressing the sub-pixels in said set of associated sub-pixels, wherein said compressed sub-pixels are stored in said frame buffer memory.

33. The system of claim 23, further comprising:
a read module configured for reading said associated sub-pixels from said frame buffer memory; and at least one of:
a graphic pipeline configured for further processing information related to said associated sub-pixels, and
a decoder configured for decompressing said associated sub-pixels in order to generate corresponding uncompressed sub-pixel information.

34. The system of claim 23, wherein, for a first sub-pixel of said respective adaptively filtered set, said adaptive filtering means include means for performing:
If (distance(A,D)<=distance(C,B)) and (distance(A,D)<=distance(A,C))
Then AA=median(E,N,C)
Else
If (distance(C,B)<=distance(A,D)) and (distance(C,B)<=distance(A,C))
Then AA=median(E,N,A)
Else
If a[distance(A,C)+distance(B,D)]/2<=distance(A,D)) and ([distance(A,C)+distance(B,D)]/2<=distance(C,B))) or (([distance(A,B)+distance(C,D)]/2<=distance(A,D)) and ([distance(A,B)+distance(C,D)]/2 distance(C,B)))
Then AA=(A+C+N+E)/4
where AA is said first sub-pixel, A, B, C, and D are the sub-pixels of said set of associated sub-pixels, and E and N are sub-pixels in said set of neighboring pixels, while median and distance are median and distance operators.

35. The system of claim 34, wherein, for a second sub-pixel of said respective adaptively filtered set, said adaptive filtering means include means for performing:
If (distance(A,D)<=distance(C,B)) and (distance(A,D)<=distance(A,B))
Then BB=median(F,G,B)
Else
If (distance(C,B)<=distance(A,D)) and (distance(C,B)<=distance(A,B))
Then BB=median(F,G,A)
Else
If [distance(A,C)+distance(B,D)]/2<=distance(A,D) and [distance(A,C)+distance(B,D)]/2<=distance(C,B) or [distance(A,B)+distance(C,D)]/2<=distance(A,D) and [distance(A,B)+distance(C,D)]/2 distance(C,B)
Then BB=(A+F+B+G)/4
where BB is said second sub-pixel, and F and G are sub-pixels of said set of neighboring sub-pixels.

36. The system of claim 35, wherein, for a third sub-pixel of said respective adaptively filtered set, said adaptive filtering means include means for performing:
If distance(A,D)<=distance(C,B) and distance(A,D)<=distance(C,D)
Then CC=median(C,M,L)
Else
If distance(C,B)<=distance(A,D) and distance(C,B)<=distance(C,D)
Then CC=median(M,L,D)
Else
If [distance(A,C)+distance(B,D)]/2<=distance(A,D) and [distance(A,C)+distance(B,D)]/2<=distance(C,B) or [distance(A,B)+distance(C,D)]/2<=distance(A,D) and [distance(A,B)+distance(C,D)]/2 distance(C,B)
Then CC=(C+M+L+D)/4
where CC is said third sub-pixel, and M and L are sub-pixels of said set of neighboring sub-pixels.

37. The system of claim 36, wherein, for a fourth sub-pixel of said respective adaptively filtered set, said adaptive filtering means include means for performing:
If distance(A,D)<=distance(C,B) and distance(A,D)<=distance(B,D)
Then DD=median(B,H,I)
Else
If distance(C,B)<=distance(A,D) and distance(C,B)<=distance(B,D)
Then DD=median(H,I,D)
Else
If [distance(A,C)+distance(B,D)]/2<=distance(A,D) and [distance(A,C)+distance(B,D)]/2<=distance(C,B) or [distance(A,B)+distance(C,D)]/2<=distance(A,D) and [distance(A,B)+distance(C,D)]/2 distance(C,B)
Then DD=(B+D+I+H)/4
where DD is said fourth sub-pixel, and I and H are sub-pixels of said set of neighboring sub-pixels.

38. The system of claim 34, wherein each sub-pixel includes a set of red, green, and blue components and the median of three of the sub-pixels is a new sub-pixel composed by red, green, and blue components where:
the red component of the new sub-pixel is the median of the red components of the three sub-pixels;
the green component of the new sub-pixel is the median of the green components of the three sub-pixels;
the blue component of the new sub-pixel is the median of components of the three sub-pixels.

39. The system of claim 34, wherein each sub-pixel includes a set of red, green, and blue components and the distance between two of the sub-pixels is defined as:
square root of ((Red pixel1−Red pixel2)*(Red pixel 1−Red pixel2)+(Green pixel1−Green pixel2)*(Green pixel1−Green pixel2)+(Blue pixel1−Blue pixel2)*(Blue pixel1−Blue pixel2)), wherein Red pixel1, Green pixel1, and Blue pixel1 are the red, green, and blue components of a first one of the two sub-pixels and Red pixel2, Green pixel1, and Blue pixel2 are the red, green, and blue components of a second one of the two sub-pixels.

40. The system of claim 34, wherein each sub-pixel includes a set of red, green, and blue components and the distance between two of the sub-pixels is defined as:
absolute value(Red pixel1−Red pixel2)+absolute value (Green pixel1−Green pixel2)+absolute value (Blue pixel1−Blue pixel2), wherein Red pixel1, Green pixel1, and Blue pixel1 are the red, green, and blue components of a first one of the two sub-pixels and Red pixel2, Green pixel2, and Blue pixel2 are the red, green, and blue components of a second one of the two sub-pixels.

41. The system of claim 23, wherein the computing means includes:
means for obtaining multiplication results by multiplying each of said the sub-pixels of said set of associated sub-pixels, said set of neighboring sub-pixels, and each sub-pixel of said respective adaptively filtered set of sub-pixels, by a respective coefficient;
obtaining a first sum by adding together the multiplication results;
obtaining a second sum by adding together the coefficients; and
dividing the first sum by the second sum.

42. The system of claim 23, wherein the computing means includes means for:
    determining a maximum or minimum sub-pixel pair by finding either a maximum or a minimum distance between (A, D), (C, B), (AA, DD), (BB, CC), where (A, B, C, D) are the sub-pixels of said set of associated sub-pixels and said set of neighboring sub-pixels while (AA, BB, CC, DD) are the sub-pixels of said respective adaptively filtered set of sub-pixels; and
    computing the final pixel as an average of the sub-pixels of the maximum or minimum sub-pixel pair.

43. The system of claim 23, wherein the computing means includes means for interpolating the sub-pixels of said respective adaptively filtered set of sub-pixels by using for each of them, four close surrounding sub-pixels.

44. A computer-readable medium comprising code portions that cause a computer to implement a method for rendering a primitive of an image to be displayed, the primitive having an area, the method including:
    locating pixels that fall within the area of said primitive; and
    for each pixel located in said area,
        generating a set of associated sub-pixels of the pixel, the sub-pixels comprised of color components;
        creating an adaptively filtered set of sub-pixels for the pixel by adaptively filtering said set of associated sub-pixels and a set of neighboring sub-pixels of one or more neighboring pixels adjacent to the pixel, wherein the creating the adaptively filtered set of sub-pixels includes computing each of the sub-pixels of the adaptively filtered set based at least in part on determining distances between at least some of the sub-pixels of the set of associated sub-pixels and sub-pixels of the set of neighboring sub-pixels, the distances being based on the color components of the at least some of the sub-pixels of the set of associated sub-pixels and sub-pixels of the set of neighboring sub-pixels; and
        computing a final pixel for display by subjecting said adaptively filtered set of sub-pixels to further filtering.

45. The computer-readable medium of claim 44, wherein the method further includes:
    compressing the sub-pixels in said set of associated sub-pixels; and
    storing said associated sub-pixels in a frame buffer in a compressed format resulting from said compressing.

46. The computer-readable medium of claim 45, wherein the method further includes:
    reading said associated sub-pixels from said frame buffer; and at least one of the steps of:
        further processing information related to said associated sub-pixels in a graphic pipeline, and
        decompressing said associated sub-pixels in order to generate corresponding uncompressed sub-pixel information.

47. The computer-readable medium of claim 44, wherein said adaptively filtering step includes, for a first sub-pixel of said adaptively filtered set, the operations of computing said first sub-pixel by:
    If (distance(A,D)<=distance(C,B)) and (distance(A,D)<=distance(A,C))
    Then AA=median(E,N,C)
    Else
    If (distance(C,B)<=distance(A,D)) and (distance(C,B)<=distance(A,C))
    Then AA=median(E,N,A)
    Else
    If (([distance(A,C)+distance(B,D)]/2<=distance(A,D)) and ([distance(A,C)+distance(B,D)]/2<=distance(C,B))) or (([distance(A,B)+distance(C,D)]/2<=distance(A,D)) and ([distance(A,B)+distance(C,D)]/2 distance(C,B)))
    Then AA=(A+C+N+E)/4
    where AA is said first sub-pixel, A, B, C, and D are the sub-pixels of said set of associated sub-pixels, and E and N are sub-pixels in said set of neighboring sub-pixels, while median and distance are median and distance operators.

48. A computing system, comprising:
    one or more processors;
    a frame buffer memory;
    a rasterizer module configured to, when executed by at least one of the processors, locate pixels that fall within an area of a primitive of an image to be displayed; and for each pixel located in the area, generate a set of associated sub-pixels of the pixel, the sub-pixels comprised of color components and store the associated sub-pixels in the frame buffer; and
    a graphic pipeline module configured to, when executed by at least one of the processors, for each of the pixel to be displayed: read the set of associated sub-pixels corresponding to the pixel from the frame buffer; create an adaptively filtered set of sub-pixels for the pixel by adaptively filtering the set of associated sub-pixels and a set of neighboring sub-pixels from one or more neighboring pixels adjacent to the pixel, the set of neighboring sub-pixels comprising sub-pixels generated for the one or more neighboring pixels; and compute a final pixel for display by subjecting the adaptively filtered set of sub-pixels to further filtering, wherein the graphic pipeline is further configured to, as part of creating the adaptively filtered set of sub-pixels, compute each of the sub-pixels of the adaptively filtered set based at least in part on determining distances between at least some of the sub-pixels of the set of associated sub-pixels and at least some sub-pixels of the set of neighboring sub-pixels, the distances being based on the color components of the at least some of the sub-pixels of the set of associated sub-pixels and the at least some sub-pixels of the set of neighboring sub-pixels.

49. A method, comprising:
    under control of a computing device, rendering a primitive of an image to be displayed, the primitive having an area and the rendering including:
    locating pixels that fall within the area of said primitive; and
    for each pixel located in said area,
        generating a set of associated sub-pixels of the pixel, the sub-pixels comprised of color components;
        creating an adaptively filtered set of sub-pixels for the pixel by adaptively filtering said set of associated sub-pixels and a set of neighboring sub-pixels of one or more neighboring pixels adjacent to the pixel;
        computing a final pixel for display by subjecting said adaptively filtered set of sub-pixels to further filtering, the computing of the final pixel for display includes determining a maximum or minimum sub-pixel pair by finding either a maximum or a minimum distance between (A, D), (C, B), (AA, DD), (BB, CC), where (A, B, C, D) are the sub-pixels of said set of associated sub-pixels and said set of neighboring sub-pixels while (AA, BB, CC, DD) are the sub-pixels of said adaptively filtered set of sub-pixels, and computing the final pixel as an average of the sub-pixels of the maximum or minimum sub-pixel pair; and displaying the final pixel on a display of the computing device.

50. The method of claim 49, wherein the generating the set of associated sub-pixels further includes compressing the sub-pixels in said set of associated sub-pixels, and wherein the creating the adaptively filtered set of sub-pixels further includes decompressing at least one set of associated sub-pixels.

51. The method of claim 49 further comprising, between said steps of generating a set of associated sub-pixels and said step of adaptively filtering, the step of storing said associated sub-pixels in a frame buffer.

52. The method of claim 51, further comprising compressing the sub-pixels in said set of associated sub-pixels, wherein the storing step includes storing said associated sub-pixels in the frame buffer in a compressed format resulting from said compressing.

53. The method of claim 52, further comprising:
reading said associated sub-pixels from said frame buffer; and at least one of the steps of:
further processing information related to said associated sub-pixels in a graphic pipeline, and
decompressing said associated sub-pixels in order to generate corresponding uncompressed sub-pixel information.

54. A system for rendering a primitive of an image to be displayed, the primitive having an area, the system comprising:
locating means for locating pixels that fall within the area of said primitive;
generating means for generating for each said pixel located in said area a set of associated sub-pixels of the pixel, the sub-pixels comprised of color components;
adaptive filtering means for creating for each of the pixels a respective adaptively filtered set of sub-pixels for the pixel by adaptively filtering said set of associated sub-pixels and a set of neighboring sub-pixels of one or more neighboring pixels adjacent to the pixel;
computing means for computing for each of the pixels a final pixel for display by subjecting said respective adaptively filtered set of sub-pixels of the pixel to further filtering; and
a frame buffer memory for storing for each of the pixels said respective set of associated sub-pixels,
wherein the computing means includes:
means for obtaining multiplication results by multiplying each of said the sub-pixels of said set of associated sub-pixels, said set of neighboring sub-pixels, and each sub-pixel of said respective adaptively filtered set of sub-pixels, by a respective coefficient;
obtaining a first sum by adding together the multiplication results;
obtaining a second sum by adding together the coefficients; and
dividing the first sum by the second sum.

55. The system of claim 54, further comprising a processing module configured for producing compressed sub-pixels by compressing the sub-pixels in said set of associated sub-pixels, wherein said compressed sub-pixels are stored in said frame buffer memory.

56. The system of claim 54, further comprising:
a read module configured for reading said associated sub-pixels from said frame buffer memory; and at least one of
a graphic pipeline configured for further processing information related to said associated sub-pixels, and
a decoder configured for decompressing said associated sub-pixels in order to generate corresponding uncompressed sub-pixel information.

* * * * *

UNITED STATES PATENT AND TRADEMARK OFFICE
CERTIFICATE OF CORRECTION

PATENT NO. : 7,876,971 B2
APPLICATION NO. : 11/526146
DATED : January 25, 2011
INVENTOR(S) : Pierluigi Gardella et al.

It is certified that error appears in the above-identified patent and that said Letters Patent is hereby corrected as shown below:

Column 20
Claim 13, Line 20, "([distance(A,B)+distance(C,D)]/2 distance(C,B)))" should read as,
--([distance(A,B)+distance(C,D)]/2<= distance(C,B)))--.

Column 20
Claim 14, Lines 42-43, "[distance(A,B)+distance(C,D)]/2<=distance(A,D) and
[distance(A,B)+distance(C,D)]/2 distance(C,B)" should read as,
--[distance(A,B)+distance(C,D)]/2<=distance(A,D) and
[distance(A,B)+distance(C,D)]/2<=distance(C,B)--.

Column 20
Claim 15, Lines 63-64, "[distance(A,B)+distance(C,D)F2<=distance(A,D) and
[distance(A,B)+distance(C,D)]/2distance(C,B)" should read as,
--[distance(A,B)+distance(C,D)/2<=distance(A,D) and
[distance(A,B)+distance(C,D)]/2<=distance(C,B)--.

Column 21
Claim 16, Lines 15-16, "[distance(A,B)+distance(C,D)]/2<=distance(A,D) and
[distance(A,B)+distance(C,D)]/2 distance(C,B)" should read as,
--[distance(A,B)+distance(C,D)]/2<=distance(A,D) and
[distance(A,B)+distance(C,D)]/2<=distance(C,B)--.

Column 23
Claim 34, Line 26, "If a[distance(A,C)+distance(B,D)]/2<=distance(A,D))" should read as,
--If (([distance(A,C)+distance(B,D)]/2<=distance(A,D))--.

Column 23
Claim 34, Line 30, "([distance(A,B)+distance(C,D)]/2 distance(C,B)))" should read as,
--([distance(A,B)+distance(C,D)]/2<=distance(C,B)))--.

Signed and Sealed this
Twenty-ninth Day of March, 2011

David J. Kappos
*Director of the United States Patent and Trademark Office*

Column 23
Claim 35, Lines 50-51, "[distance(A,B)+distance(C,D)]/2<=distance(A,D) and [distance(A,B)+distance(C,D)]/2 distance(C,B)" should read as,
--[distance(A,B)+distance(C,D)]/2<=distance(A,D) and [distance(A,B)+distance(C,D)]/2<=distance(C,B)--.

Column 24
Claim 36, Lines 1-2, "[distance(A,B)+distance(C,D)]/2<=distance(A,D) and [distance(A,B)+distance(C,D)]/2 distance(C,B)" should read as,
--[distance(A,B)+distance(C,D)]/2<=distance(A,D) and [distance(A,B)+distance(C,D)]/2<=distance(C,B)--.

Column 24
Claim 37, Lines 19-20, "[distance(A,B)+distance(C,D)]/2<=distance(A,D) and [distance(A,B)+distance(C,D)]/2 distance(CB)" should read as,
--[distance(A,B)+distance(C,D)]/2<=distance(A,D) and [distance(A,B)+distance(C,D)]/2<=distance(C,B)--.

Column 24
Claim 39, Line 44, "pixel1, and Blue pixel2 are the red, green and blue" should read as,
--pixel2, and Blue pixel2 are the red, green and blue--.

Column 26
Claim 47, Line 6, "([distance(A,B)+distance(C,D)]/2 distance(C,B)))" should read as,
--([distance(A,B)+distance(C,D)]/2<=distance(C,B)))--.

Column 28
Claim 56, Line 30, "of" should read as, --of:--.